US012563148B2

(12) United States Patent
Schulz et al.

(10) Patent No.: US 12,563,148 B2
(45) Date of Patent: Feb. 24, 2026

(54) DEVICE, SYSTEM AND METHOD FOR CANCELLING ECHO AT ELECTRONIC DEVICES

(71) Applicant: MITEL NETWORKS CORPORATION, Kanata (CA)

(72) Inventors: Dieter Schulz, Dunrobin (CA); Mirjana Popovic, Ottawa (CA); Roger Bastin, Carp (CA)

(73) Assignee: Mitel Networks Corporation, Kanata (CA)

( * ) Notice: Subject to any disclaimer, the term of this patent is extended or adjusted under 35 U.S.C. 154(b) by 197 days.

(21) Appl. No.: 18/388,100

(22) Filed: Nov. 8, 2023

(65) Prior Publication Data

US 2025/0150539 A1 May 8, 2025

(51) Int. Cl.
H04M 9/08 (2006.01)
H04B 3/20 (2006.01)

(52) U.S. Cl.
CPC .............. H04M 9/082 (2013.01); H04B 3/20 (2013.01)

(58) Field of Classification Search
CPC ........ H04M 9/082; H04M 9/08; H04M 3/002; H04M 3/18; H04B 3/23; H04B 3/234; H04B 3/20; H04B 3/231; H04B 3/237; H04B 3/493; H04B 7/015; H04B 1/525; G10L 2021/02082; G10L 21/0208; H04R 3/02
See application file for complete search history.

(56) References Cited

U.S. PATENT DOCUMENTS

| | | | | |
|---|---|---|---|---|
| 5,610,909 A * | 3/1997 | Shaw | .................... | H04M 9/082 |
| | | | | 370/291 |
| 6,137,882 A * | 10/2000 | Eriksson | .................. | H04B 3/23 |
| | | | | 379/406.08 |
| 6,944,289 B2 * | 9/2005 | Tahernezhaadi | ....... | H04B 3/493 |
| | | | | 379/406.01 |
| 7,072,466 B2 * | 7/2006 | Lilliott | .................... | H04B 3/23 |
| | | | | 379/406.01 |
| 8,929,263 B2 * | 1/2015 | Ramalho | .............. | H04M 3/002 |
| | | | | 370/286 |
| 9,154,187 B2 * | 10/2015 | Pandey | .................... | H04B 3/23 |
| 9,307,318 B2 * | 4/2016 | Anderton | ................ | H04R 3/02 |
| 9,602,923 B2 * | 3/2017 | Florencio | .............. | H04R 3/005 |
| 10,498,389 B2 * | 12/2019 | Awano | ................... | H04B 3/234 |
| 2003/0231763 A1 * | 12/2003 | Lilliott | .................... | H04B 3/23 |
| | | | | 379/406.01 |

(Continued)

*Primary Examiner* — Akelaw Teshale

(57) ABSTRACT

A device, system and method for cancelling echo at electronic devices are provided. The device comprises: a send path comprising a send input and output; a receive path comprising a receive input and output; an echo estimator engine that determines an estimate of echo, on the send path; a subtractor engine subtracts the estimated echo from a send signal received at the send input; a delay buffer engine; and an adder. The delay buffer engine provides, to the adder engine, a delayed-attenuated portion of a receive signal, received at the receive input, delayed by a given delay period corresponding to at least a delay of the echo between the receive path and the send input. The adder engine adds the delayed-attenuated portion to the send signal. The echo estimator engine determines the estimated echo using at least the delayed-attenuated portion of the receive signal added to the send signal.

20 Claims, 6 Drawing Sheets

(56)          References Cited

U.S. PATENT DOCUMENTS

| | | | | |
|---|---|---|---|---|
| 2004/0141608 | A1* | 7/2004 | Imata .................... | H04M 9/082 |
| | | | | 379/406.08 |
| 2005/0220043 | A1 | 10/2005 | Handel et al. | |
| 2008/0159551 | A1* | 7/2008 | Harley ................. | H04M 9/082 |
| | | | | 381/66 |
| 2008/0205633 | A1* | 8/2008 | Dyba .................... | H04B 3/237 |
| | | | | 379/406.08 |
| 2010/0285736 | A1* | 11/2010 | Gore ................. | H04B 7/15585 |
| | | | | 455/7 |
| 2011/0170683 | A1* | 7/2011 | Lu ......................... | H04M 3/002 |
| | | | | 379/406.01 |
| 2014/0133648 | A1* | 5/2014 | Czyzewski .......... | H04M 9/082 |
| | | | | 379/406.08 |
| 2017/0310360 | A1* | 10/2017 | Gejo .................... | H04M 3/002 |
| 2017/0318161 | A1* | 11/2017 | Zhou ....................... | H04M 9/08 |
| 2019/0130930 | A1* | 5/2019 | Tong ................... | G10L 21/0208 |
| 2021/0051404 | A1 | 2/2021 | Li et al. | |

* cited by examiner

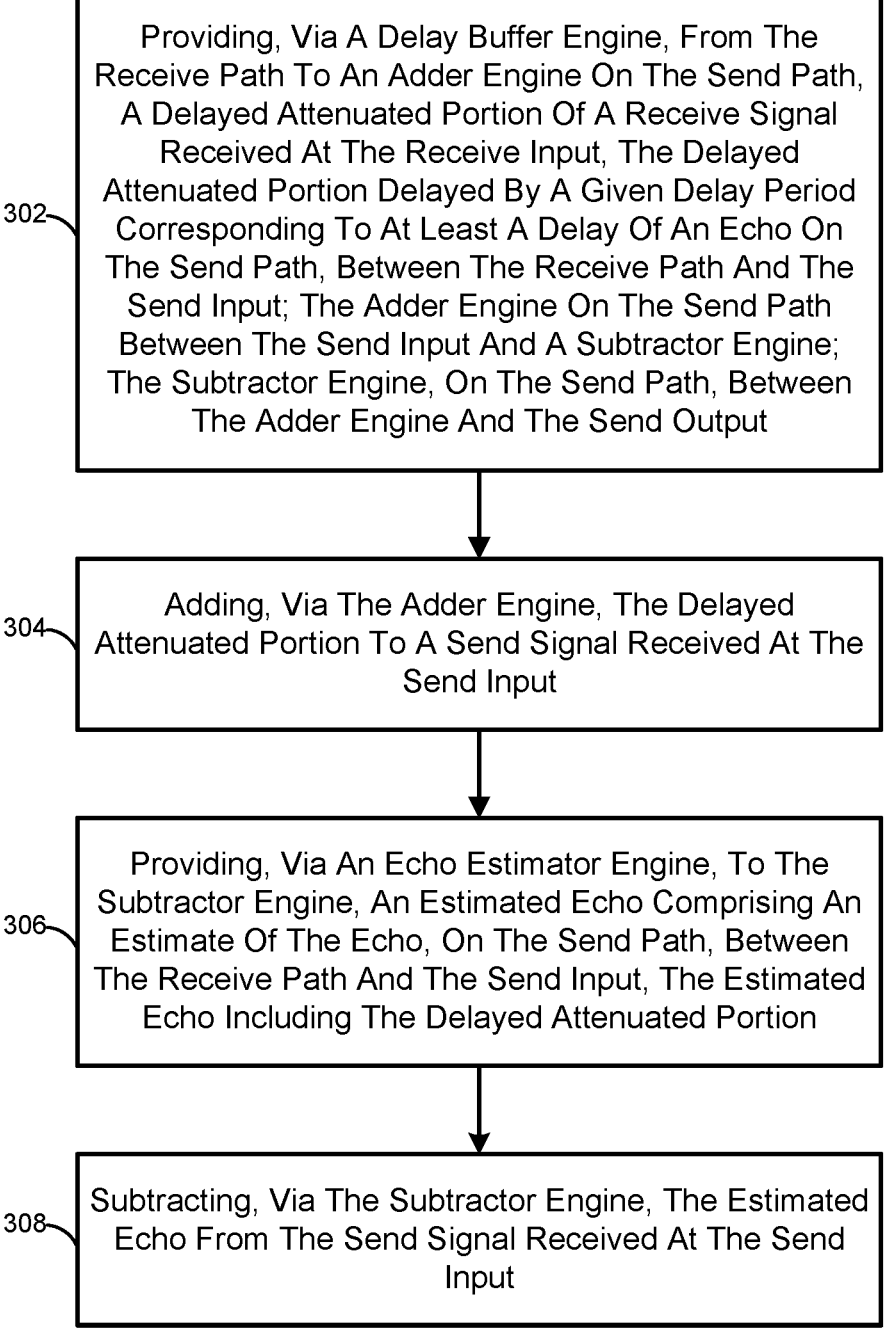

302 — Providing, Via A Delay Buffer Engine, From The Receive Path To An Adder Engine On The Send Path, A Delayed Attenuated Portion Of A Receive Signal Received At The Receive Input, The Delayed Attenuated Portion Delayed By A Given Delay Period Corresponding To At Least A Delay Of An Echo On The Send Path, Between The Receive Path And The Send Input; The Adder Engine On The Send Path Between The Send Input And A Subtractor Engine; The Subtractor Engine, On The Send Path, Between The Adder Engine And The Send Output 304 — Adding, Via The Adder Engine, The Delayed Attenuated Portion To A Send Signal Received At The Send Input 306 — Providing, Via An Echo Estimator Engine, To The Subtractor Engine, An Estimated Echo Comprising An Estimate Of The Echo, On The Send Path, Between The Receive Path And The Send Input, The Estimated Echo Including The Delayed Attenuated Portion 308 — Subtracting, Via The Subtractor Engine, The Estimated Echo From The Send Signal Received At The Send Input

DEVICE, SYSTEM AND METHOD FOR CANCELLING ECHO AT ELECTRONIC DEVICES

FIELD

The present specification generally relates to cancelling echo at electronic devices. More particularly, exemplary embodiments of the specification relate to a device, system and method for cancelling echo at electronic devices that include a microphone and a speaker, headsets, conferencing devices, line or network echo cancellers, and the like.

BACKGROUND

Certain devices that include inputs and outputs for sending and receiving signals, such as audio signals, network signals, and the like, may incur echo that occurs between a receive path and a send path. For example, at a headset, a conferencing device, and the like, received audio signals that are output by a speaker may be picked up by a microphone, such that the received audio signals become echo on a send audio signal received at the microphone. Similarly, at a device in a network, there may be cross-talk between a send path and a receive path such that receive path signals are picked up on the send path, and become echo in send path signals.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

Subject matter of the present specification is particularly pointed out and distinctly claimed in the concluding portion of the specification. A more complete understanding of the present specification, however, may best be obtained by referring to the detailed description and claims when considered in connection with the drawing figures.

FIG. 3 illustrates a method for cancelling echo at electronic devices, in accordance with exemplary embodiments of the specification.

Figure 1:
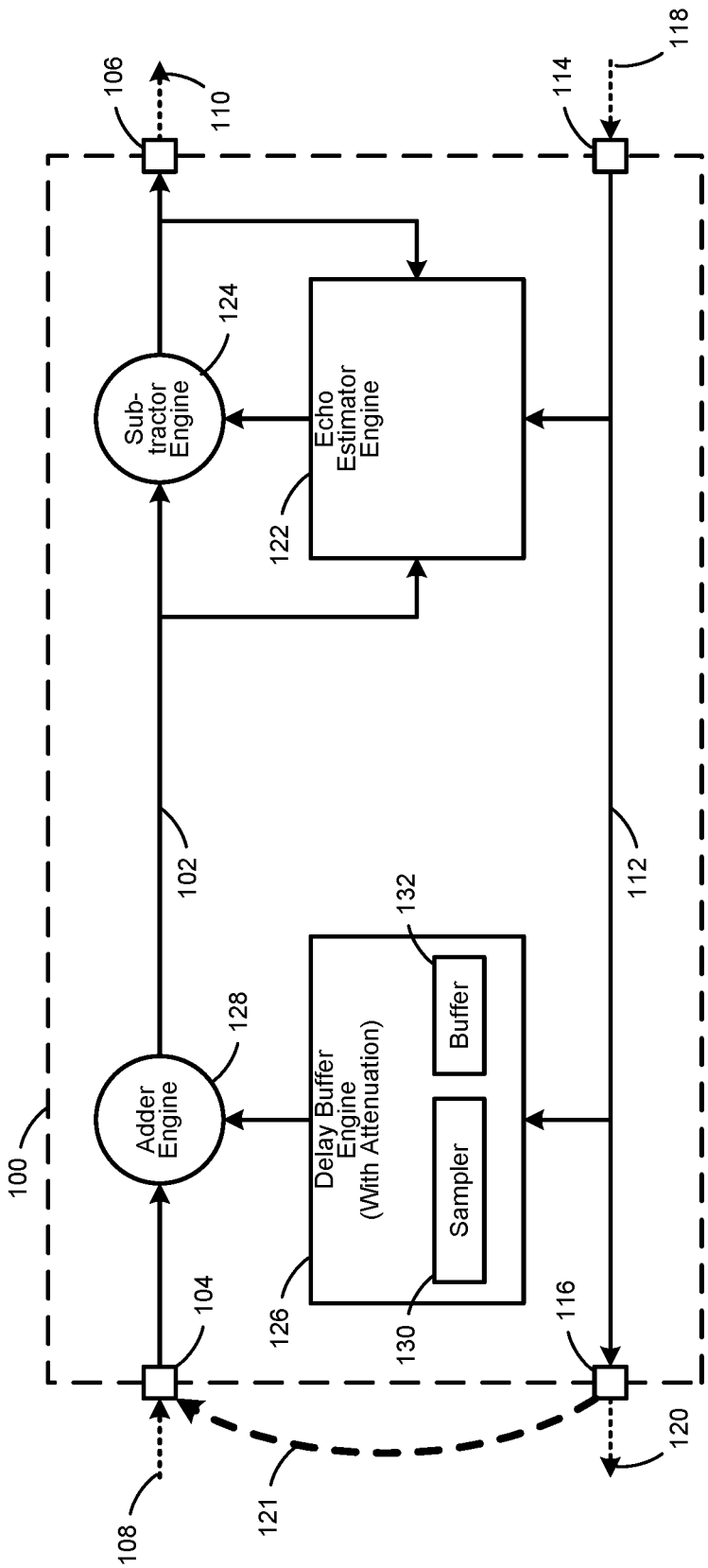
FIG. 1 illustrates a device in accordance with exemplary embodiments of the specification.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present specification.

DETAILED DESCRIPTION OF EXEMPLARY EMBODIMENTS

The description of various embodiments of the present specification provided below is merely exemplary and is intended for purposes of illustration only; the following description is not intended to limit the scope of the specification disclosed herein. Moreover, recitation of multiple embodiments having stated features is not intended to exclude other embodiments having additional features or other embodiments incorporating different combinations of the stated features.

The specification describes exemplary devices, systems, and methods. As set forth in more detail below, exemplary devices, systems, and methods described herein may be conveniently used in any suitable devices that include a microphone and a speaker, headsets, conferencing devices, line or network echo cancellers, and the like. However, the specification is not limited to such applications.

As used herein, the term "engine" refers to hardware (e.g., a controller and/or a processor, such as a central processing unit (CPU), graphics processing unit (GPU), an integrated circuit or other circuitry) or a combination of hardware and software (e.g., programming such as machine- or processor-executable instructions, commands, or code such as firmware, a device driver, programming, object code, etc. as stored on hardware). Hardware includes a hardware element with no software elements such as an application specific integrated circuit (ASIC), a Field Programmable Gate Array (FPGA), a PAL (programmable array logic), a PLA (programmable logic array), a PLD (programmable logic device), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or implemented or interpreted by a processor), or hardware and software hosted at hardware.

Furthermore, communication directions and/or flow of signals between components of examples described herein are depicted throughout the present specification, as solid (i.e. non-dashed) arrows between respective components, with the arrow showing a direction of signal flow between the components.

In contrast, signals of examples described herein are depicted throughout the present specification, as dashed arrows, with the arrow showing a direction of signal flow.

An aspect of the present specification provides a device comprising: a send path comprising a send input and a send output; a receive path comprising a receive input and a receive output; an echo estimator engine configured to determine an estimated echo comprising an estimate of echo, on the send path, between the receive path and the send input; a subtractor engine, on the send path, configured to subtract the estimated echo from a send signal received at the send input; a delay buffer engine between the send path and the receive path; and an adder engine on the send path between the send input and the subtractor engine, the delay buffer engine configured to provide, from the receive path to the adder engine, a delayed attenuated portion of a receive signal, received at the receive input, the delayed attenuated portion delayed by a given delay period corresponding to at least a delay of the echo between the receive path and the send input, the adder engine configured to add the delayed attenuated portion to the send signal, and the echo estimator engine further configured to determine the estimated echo using at least the delayed attenuated portion of the receive signal added to the send signal.

An aspect of the present specification provides a method for implementation at a device comprising a send path and a receive path, the send path comprising a send input and a send output, and the receive path comprising a receive input and a receive output, the method comprising: providing, via a delay buffer engine, from the receive path to an adder engine on the send path, a delayed attenuated portion of a receive signal received at the receive input, the delayed attenuated portion delayed by a given delay period corresponding to at least a delay of an echo on the send path, between the receive path and the send input; the adder engine on the send path between the send input and a subtractor engine; the subtractor engine, on the send path, between the adder engine and the send output; adding, via the adder engine, the delayed attenuated portion to a send signal received at the send input; providing, via an echo estimator engine, to the subtractor engine, an estimated echo comprising an estimate of the echo, on the send path, between the receive path and the send input, the estimated echo including the delayed attenuated portion; and, subtracting, via the subtractor engine, the estimated echo from the send signal received at the send input.

Another aspect of the present specification provides a non-transitory computer-readable medium storing a computer program, wherein execution of the computer program is for implementation at a device comprising a send path and a receive path, the send path comprising a send input and a send output, and the receive path comprising a receive input and a receive output, the computer program for: providing, via a delay buffer engine, from the receive path to an adder engine on the send path, a delayed attenuated portion of a receive signal received at the receive input, the delayed attenuated portion delayed by a given delay period corresponding to at least a delay of an echo on the send path, between the receive path and the send input; the adder engine on the send path between the send input and a subtractor engine; the subtractor engine, on the send path, between the adder engine and the send output; adding, via the adder engine, the delayed attenuated portion to a send signal received at the send input; providing, via an echo estimator engine, to the subtractor engine, an estimated echo comprising an estimate of the echo, on the send path, between the receive path and the send input, the estimated echo including the delayed attenuated portion; and, subtracting, via the subtractor engine, the estimated echo from the send signal received at the send input.

FIG. 1 illustrates a device 100 in accordance with exemplary embodiments of the specification. The device 100 is generally indicated using a box drawn with dashed lines, though components of the device 100 contained in the box may be provided separately and/or as a system (e.g., the device 100 may be replaced with a system that includes the components of the device 100).

The device 100 comprises: a send path 102 comprising a send input 104 and a send output 106 therebetween. For example, as depicted, an incoming send signal 108 is received at the send input 104 and an outgoing send signal 110 is output at the send output 106.

The device 100 further comprises a receive path 112 comprising a receive input 114 and a receive output 116 therebetween. For example, as depicted, an incoming received signal 118 is received at the receive input 114 and an outgoing receive signal 120 is output at the receive output 116.

In a particular example, the device 100 may comprise a headset, a conferencing device, and the like, and/or may be in communication with a headset, a conferencing device, and the like, and may act as an acoustic echo canceller for a headset, a conferencing device, and the like.

For example, the send input 104 may comprise a microphone and/or may be connectable to a microphone, and the send output 106 may be connectable to a network over which the outgoing send signal 110 is transmitted. Similarly, the receive input 114 may be connectable to the network from which the incoming receive signal 118 is received, and the receive output 116 may comprise a speaker and/or may be connectable to a speaker.

In another example, the device 100 may comprise a line and/or network echo canceller, and the like. In these examples, the send input 104 may be connectable to a first network component, such as a first transmitter, from which the incoming send signal 108 is received, and the send output 106 may be connectable to a second network component, such as a first receiver, to which the outgoing send signal 110 is transmitted. Similarly, the send input 104 may be connectable to a third network component, such as a second transmitter, from which the incoming receive signal 118 is received, and the receive output 116 may be connectable to a fourth network component, such as a second receiver, to which the outgoing receive signal 120 is transmitted.

Regardless, it is understood that an echo 121 may occur between the receive output 116 (and/or the receive path 112) and the send input 104 (and/or the send path 102). For example, when the send input 104 comprises a microphone (or is connectable to a microphone), and the receive output 116 comprises a speaker (or is connectable to a speaker), the outgoing receive signal 120 may comprise audio output by the speaker, may be picked up the microphone, as the echo 121. However, the echo 121 is understood to be attenuated and delayed relative to the outgoing receive signal 120, for example as the echo 121 represents a portion of the outgoing receive signal 120 that travels over a path (e.g., an echo path as also indicated by the dashed line representing the echo 121) from the receive output 116 to the send input 104. Hence, the incoming send signal 108, once received at the send input 104, may include the echo 121 added thereto and, if not removed from the incoming send signal 108, the outgoing send signal 110 may also include the incoming send signal 108 with the echo 121 added thereto.

In another example, when the device 100 comprises a line and/or network echo canceller, the echo 121 may occur between the receive output 116 and the send input 104 and/or between the paths 112, 102, for example due to crosstalk between the paths 102, 112.

As such, the device 100 is generally configured to cancel echo on the send path 102 as is next described.

In particular, the device 100 further includes an echo estimator engine 122, a subtractor engine 124, a delay buffer engine 126 and an adder engine 128.

The subtractor engine 124 and the adder engine 128 are located on the send path 102. In particular, the adder engine 128 is located between the send input 104 and the subtractor engine 124, and the subtractor engine 124 located between the adder engine 128 and the send output 106. Put another way, the adder engine 128 is located on the send path 102 prior to the subtractor engine 124 in a direction of send signal flow on the send path 102, and/or the subtractor engine 124 is located on the send path 102 after the adder engine 128 in a direction of send signal flow on the send path 102

The echo estimator engine 122 is located between the receive path 112 and the send path 102 and is in communication with the subtractor engine 124.

The delay buffer engine 126 is located between the receive path 112 and the send path 102 and is in communication with the adder engine 128.

In particular, the echo estimator engine 122 is configured to determine an estimated echo comprising an estimate of any echo on the send path 102, such as the echo 121 and provide the estimated echo to the subtractor engine 124.

The subtractor engine 124 is configured to subtract the estimated echo from the (e.g., incoming) send signal 108 received at the send input 104. Hence it is understood that the echo estimator engine 122 is configured to: determine the estimated echo; and provide the estimated echo to the subtractor engine 124 such that the subtractor engine 124 may subtract the estimated echo from the (e.g., incoming) send signal 108 received at the send input 104, to generate the outgoing send signal 110.

For example, as depicted, the echo estimator engine 122 is in communication with the receive path 112 (e.g., prior to the delay buffer engine 126 in a direction of receive signal flow), and is generally configured to sample the incoming receive signal 118 on the receive path 112, which may represent the echo 121. Such sampling may occur according to any suitable sampling rate, such as 8 kHz, 16 kHz, 32 kHz, amongst other possibilities. Using 16 kHz as a particular example sampling rate, this results in 16,000 samples per second, or 16 samples per 1 ms, or 64 samples per 4 ms.

The echo estimator engine 122 is further in communication with the send path 102 before the subtractor engine 124 (and after the adder engine 128), and after the subtractor engine 124 (and before the send output 106). In particular, the echo estimator engine 122 is generally further configured to sample the (e.g., incoming) send signal 108 on the send path 102 between the adder engine 128 and the subtractor engine 124, and sample the (e.g., outgoing) send signal 110 on the send path 102 after the subtractor engine 124 (e.g., after the subtractor engine 124 subtracts the estimated echo).

Hence, the echo estimator engine 122 provides a feedback loop in the device 100 where the echo estimator engine 122 compares the sampled incoming receive signal 118, that represents the echo 121, with the sampled incoming send signal 108 (e.g., prior to the subtractor engine 124) to locate the estimate echo (e.g., an intensity and a temporal location) in the incoming send signal 108. In particular, the echo estimator engine 122 searches the sampled incoming send signal 108 for a portion that corresponds to the sampled incoming receive signal 118. The estimated echo is provided to the subtractor engine 124, which subtracts the estimated echo from incoming send signal 108 for example according to an intensity and temporal location of the echo 121 indicated by the incoming send signal 108, to generate the outgoing send signal 110.

The echo estimator engine 122 further samples the outgoing send signal 110, after the subtractor engine 124, to determine whether the estimated echo was successfully subtracted from incoming send signal 108 by the subtractor engine 124. When the echo 121 is still at least partially present in the outgoing send signal 110 (e.g., the outgoing send signal 110 continues to include echo 121 that corresponds to the sampled incoming receive signal 118), the echo estimator engine 122 may increase or decrease an intensity of further estimated echo and/or the echo estimator engine 122 may adjust a temporal location of the further estimated echo, and provide the further estimated echo to the subtractor engine 124.

Put another way, the echo estimator engine 122 may converge on an estimated echo in the feedback loop.

However, functionality of the subtractor engine 124 and the echo estimator engine 122 is generally based on the assumption that the echo path of the echo 121 is linear. However, when the echo path of the echo 121 is non-linear, and the like, the echo estimator engine 122 may have challenges in estimating harmonics in the estimated echo.

Similarly, when the echo 121 is small (e.g., such that the echo 121 is hard to detect in the incoming send signal 108), the echo estimator engine 122 may have challenges in estimating the echo 121.

As such, the delay buffer engine 126 and the adder engine 128 are generally configured to add a delayed attenuated portion of the incoming receive signal 118 (e.g., representing a "known echo") to the incoming send signal 108, as is next described, which may generally better enable the echo estimator engine 122 to converge on an estimated echo in the feedback loop (e.g., the estimated echo including the echo 121 and the delayed attenuated portion of the incoming receive signal 118).

For example, the delay buffer engine 126 is in communication with the receive path 112, and configured to sample the incoming receive signal 118 on the receive path 112 (e.g., at a same sampling rate as the echo estimator engine 122, though the sampling rates may, in some examples, be different).

In particular, the delay buffer engine 126 is generally configured to provide, from the receive path 112 to the adder engine 128, a delayed attenuated portion of the incoming receive signal 118, received at the receive input 114, the delayed attenuated portion delayed by a given delay period corresponding to at least a delay of the echo 121 on the echo path (e.g., between the receive output 116 and the send input 104 and/or between the paths 112, 102). In the example of the send input 104 and the receive output 116 respectively comprising (e.g., and the like) a microphone and a speaker, such a delay of the echo 121 may comprise an acoustic delay. In the example of device 100 comprising a line and/or network echo canceller, such a delay of the echo 121 may comprise a crosstalk delay.

For example, a delay of the echo 121 between the receive output 116 and/or the receive path 112 may be heuristically determined (e.g., and may be 80 ms, 100 ms, 120 ms, amongst other possibilities). Alternatively, or in addition, the delay may be determined using computer modelling of the echo path of the echo 121, and the like. Indeed the delay of the echo 121 may depend on a type of the device 100. For example, a conferencing device may have a delay of about 100 ms in the buffer, however a line or network echo canceller may have a delay between 64 ms and 128 ms.

Similarly, the delayed attenuated portion of the incoming receive signal 118 may be attenuated by an amount corresponding to an attenuation of the echo 121 between the receive output 116 and/or the receive path 112, and the send input 104 and/or the send path 102. For example, an attenuation of the echo 121 between the receive output 116 and/or the receive path 112 may be heuristically determined (e.g., and may be 18 dB, 20 dB, 25 dB, amongst other possibilities). Alternatively, or in addition, the attenuation may be determined using computer modelling of the echo path of the echo 121, and the like.

Regardless, the delay buffer engine 126 is generally configured to sample and attenuate the receive signal 118 by a given attenuation factor, corresponding to an attenuation of the echo 121 between the receive output 116 and/or the receive path 112, and the send input 104 and/or the send path 102. In some of these examples, the attenuation may be determined using computer modelling of the echo path of the echo 121, and the like. Put another way, the given attenuation factor may be based on a modelled echo path between the receive output 116 and the send input 104. For example, when the send input 104 and the receive output 116 respectively comprise (or are respectively connected to) a microphone and speaker, positions of the microphone and the speaker may be modelled in any suitable audio computer modelling software, and an attenuation factor therebetween may be determined accordingly.

Returning to the given delay period, such audio computer modelling software may be used to determine the given delay period, taking into account, however a time period for sampling the received signal 118 on the receive path 112.

For example, as depicted, the delay buffer engine 126 may comprise a sampler 130 (e.g., a sampler engine) and a buffer 132 (e.g., a memory buffer) and the like.

The sampler 130 may be generally configured to sample and attenuate the receive signal 118 on the receive path 112 to generate an attenuated portion of the receive signal 118.

The buffer 132 may be generally configured to buffer (e.g., store) the attenuated portion of the receive signal 118 by the given delay period to generate the delayed attenuated portion of the receive signal 118.

However, sampling of the receive signal 118 takes time. Hence, the given delay period may be adjusted to take into account such sampling. For example, if the modelled (and the like) given delay period is 100 ms, and the sampling time period to sample the receive signal 118 is 4 ms, the given delay period for which the attenuated portion of the receive signal 118 is buffered at the buffer 132 may be adjusted to 96 ms (e.g., 100 ms minus 4 ms), such that the given time period that the attenuated portion of the receive signal 118 is buffered at the buffer 132, plus the sampling time period, is about equal to the modelled given delay period.

Hence, in general, the delayed attenuated portion of the receive signal 118 that is added to the incoming send signal 108 generally mimics the echo 121.

The delay buffer engine 126 provides the delayed attenuated portion of the receive signal 118 to the adder engine 128, which is generally configured to add the delayed attenuated portion to the (e.g., incoming) send signal 108, ideally at a same or similar temporal location as the echo 121 in the send signal 108 due to the buffering of the attenuated portion of the receive signal 118 at the buffer 132.

As such, the delayed attenuated portion of the receive signal 118 added to the incoming send signal 108, which may better enable the echo estimator engine 122 to converge on an estimated echo in the feedback loop. In particular, the echo estimator engine 122 is generally further configured to determine the estimated echo using at least the delayed attenuated portion of the receive signal 118 added to the send signal estimate the echo 121.

Furthermore, a cancellation window of the echo estimator engine 122 is generally selected such that the echo 121 in the send signal 108, and the delayed attenuated portion added to the send signal 108 occur within the cancellation window. Put another way, while the echo 121 in the send signal 108, and the delayed attenuated portion added to the send signal 108 are ideally aligned, some error may occur in the buffering at the delay buffer engine 126 (and such error tends to be predictable), and/or the delay buffer engine 126 may operate within certain tolerances, such that the echo 121 in the send signal 108, and the delayed attenuated portion added to the send signal 108 may not exactly align. Hence, a cancellation window of the echo estimator engine 122 may be selected taking into account such error and/or tolerances.

The cancellation window is understood to comprise a window (e.g., of time, and/or a time period) over which the echo estimator engine 122 is searching for echo on the send path 102. For example, the cancellation window may be 4 ms, 8 ms, 16 ms, amongst other possibilities, and may depend on the sampling rate of the echo estimator engine 122. In a particular example, for a sampling rate of 16 kHz, the cancellation window may be 4 ms (e.g., which results in 64 samples per 4 ms). However, knowing the error and/or tolerances of the delay buffer engine 126, the cancellation window may be increased or decreased accordingly, to ensure that the echo 121 and the delayed attenuated portion occur in the send signal 108 within the cancellation window.

In this manner the echo estimator engine 122 may more quickly converge on an estimated echo, as compared to when the delay buffer engine 126 and the adder engine 128 are absent in the device 100.

It is further understood that operations described herein that occur at the device 100 are generally in the digital domain, however the incoming signals 108, 118 may be in a digital or analog format, and furthermore, the outgoing signals 110, 120 may be to a digital device or an analog device. In many examples, where the incoming signals 108, 118 are digital, and the outgoing signals 110, 120 are to digital devices, the device 100 may be provided as depicted herein. However, when one or more of the incoming signals 108, 118 are analog, the device 100 may further comprise an analog-to-digital converter (ADC) at the send input 104 (e.g., to convert an analog incoming send signal 108 to digital), and/or the device 100 may further comprise an ADC at the receive input 114 (e.g., to convert an analog incoming receive signal 118 to digital). Similarly, when one or more of the outgoing signals 110, 120 are analog, the device 100 may further comprise a digital-to-analog converter (DAC) at the send output 106 (e.g., to convert the outgoing send signal 110 to analog), and/or the device 100 may further comprise a DAC at the receive output 116 (e.g., to convert the outgoing receive signal 120 to analog). However, any ADCs and/or DACS may be located at any suitable position in the device 100, depending, for example, on whether the incoming signals 108, 118 are digital or analog, and whether the outgoing signals 110, 120 are to be digital or analog. Indeed, DACs and/or ADCs may be incorporated into the device 100 in any suitable manner. For example, when the incoming receive signal 118 is analog, the engines 126, 122 may comprise respective ADCs.

Figure 2:
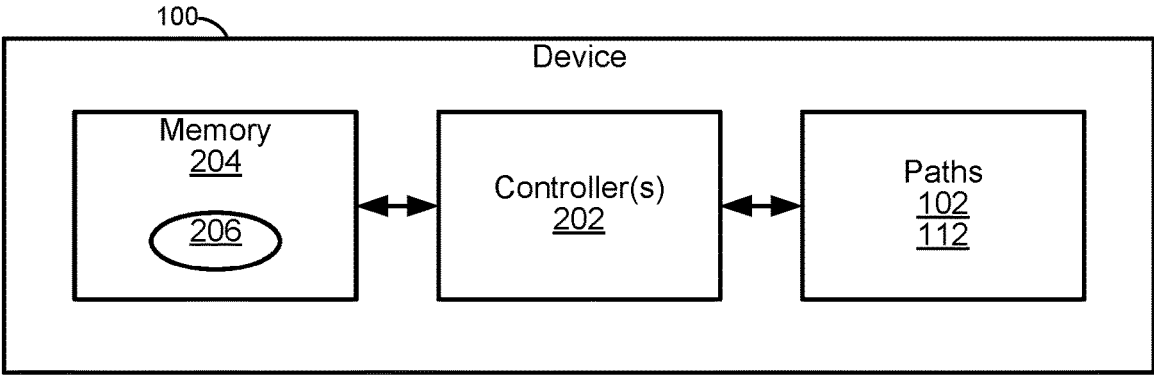
FIG. 2 illustrates an exemplary device for cancelling echo at electronic devices, in accordance with exemplary embodiments of the specification.

Attention is next directed to FIG. 2, which depicts an example schematic diagram of hardware components of the device 100. As shown in FIG. 2, the device 100 includes at least one controller 202, such as a central processing unit (CPU) or the like, interconnected with a memory 204, storing an application 206, and the paths 102, 112. The memory 204 implemented as a suitable non-transitory computer-readable medium (e.g., a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 202 and the memory 204 may generally comprise one or more integrated circuits (ICs).

The controller 202 is also interconnected with, and/or in communication with, the paths 102, 112 (e.g., which, while not depicted are understood to include the inputs 104, 114 and the outputs 106, 116), for example to perform the sampling of the signals 108, 110, 118 as described herein.

The memory 204 also stores a plurality of computer-readable programming instructions, executable by the controller 202, in the form of various applications, including the application 206 used to implement the engines 122, 124, 126, 128, 130. At least a portion of the memory 204 may be dedicated to the buffer 132 and/or the memory 204 may comprise the buffer 132.

As will be understood by those skilled in the art, the controller 202 executes the instructions of the application 206 in order to perform a set of operations defined by the instructions contained therein including, but not limited to, the blocks of a method described with respect to FIG. 3. In the description below, the controller 202, and more generally the device 100. It will be understood that they are so configured via the execution (by the controller 202) of the instructions of the application 206 stored in the memory 204. Put another way, the device 100 may comprise a computer-readable storage medium (e.g., a non-transitory computer-readable storage medium) having stored thereon program instructions that, when executed by the controller 202, causes the controller 202 to perform a set of operations comprising the blocks of the method described with respect to FIG. 3.

Referring to FIG. 3, a flowchart of a method 300 for cancelling echo at electronic devices is depicted. The operations of the method 300 of FIG. 3 correspond to machine readable instructions that are executed by device 100, for example by the controller 202. In the illustrated example, the instructions represented by the blocks of FIG. 3 may be stored at a memory 204, for example as the application 206. The method 300 of FIG. 3 is one way in which the device 100 and/or the controller 202 may be configured. Furthermore, the following discussion of the method 300 of FIG. 3 will lead to a further understanding of the device 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the device 100 of FIG. 5 and FIG. 6, as well.

Beginning at a block 302, the device 100 and/or the controller 202 provides, via the delay buffer engine 126, from the receive path 112 to an adder engine 128 on the send path 102, a delayed attenuated portion of a receive signal 118 received at the receive input 114, the delayed attenuated portion delayed by a given delay period corresponding to at least a delay of the echo 121 on the send path 102, between the receive path 112 and the send input 104; the adder engine 128 on the send path 102 between the send input 104 and a subtractor engine 124; the subtractor engine 124, on the send path 102, between the adder engine 128 and the send output 106.

At a block 304, the device 100 and/or the controller 202 adds, via the adder engine 128, the delayed attenuated portion to the send signal 108 received at the send input 104.

At a block 306, the device 100 and/or the controller 202 provides, via the echo estimator engine 122, to the subtractor engine 124, an estimated echo comprising an estimate of the echo 121, on the send path 102, between the receive path 112 and the send input 104, the estimated echo including the delayed attenuated portion.

At a block 308, the device 100 and/or the controller 202 subtracts, via the subtractor engine 124, the estimated echo from the send signal 108 received at the send input 104 (e.g., to generate the output send signal 110.

Figure 4:
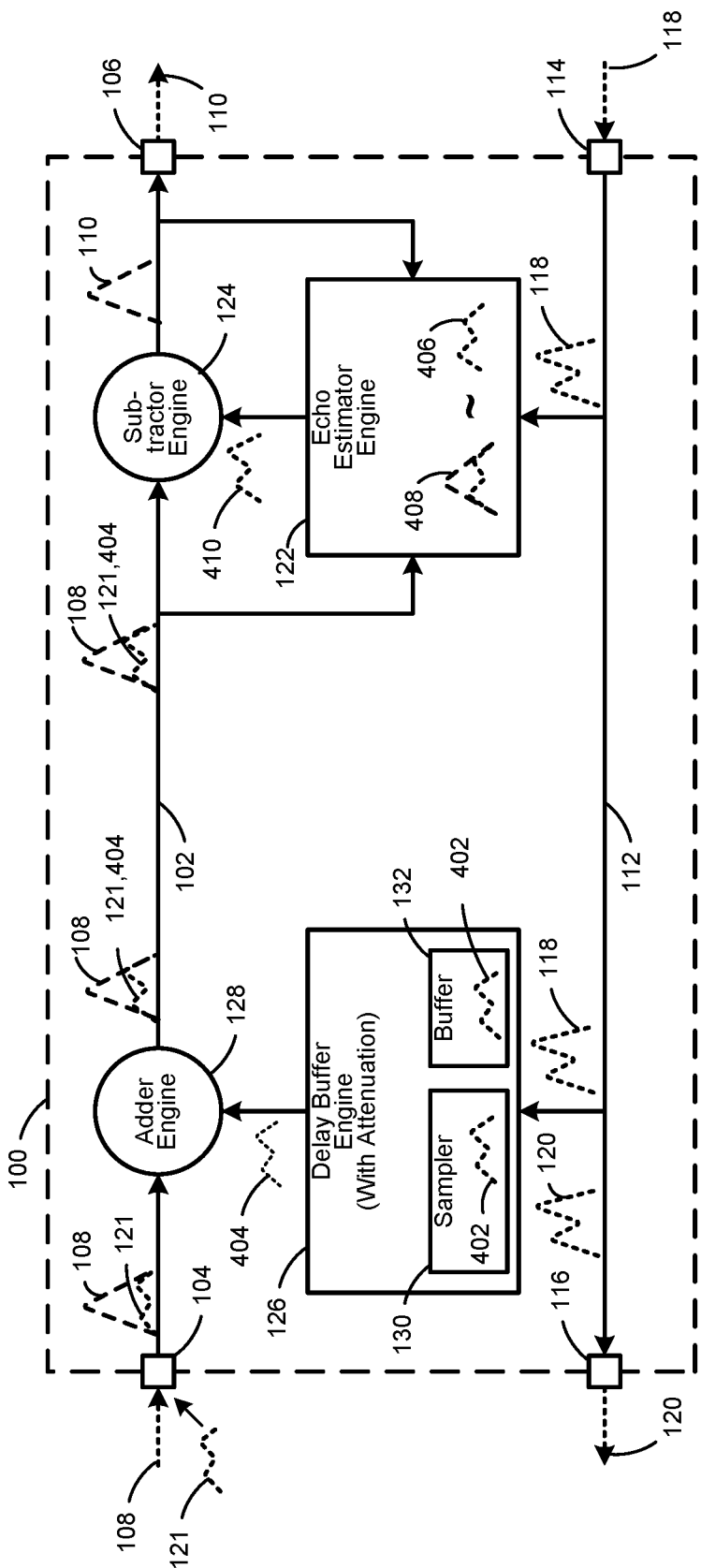
FIG. 4 depicts the device of FIG. 1 implementing a method for cancelling echo, in accordance with exemplary embodiments of the specification.

Attention is next directed to FIG. 4, which depicts an example of the method 300 and the device 100 in operation.

As depicted, the device 100 is respectively receiving, at the send input 104 and the receive input 114, the input send signal 108 and the input receive signal 118. Details of an example input send signal 108 and an example input receive signal 118 are respectively depicted on the send path 102 and the receive path 112, for example depicted as frequency as a function of time. Furthermore the signals 108, 118 are depicted with different dashed lines to better distinguish therebetween.

As depicted, the delay buffer engine 126 samples the input receive signal 118 on the receive path 112, via the sampler 130 to generate an attenuated portion 402 of the receive signal 118, which is buffered at the buffer 132 for the aforementioned given delay period to generate a delayed attenuated portion 404 of the receive signal 108, which is provided (e.g., at the block 302 of the method 300) to the adder engine 128 by the delay buffer engine 126. The adder engine 128 adds (e.g., at the block 304 of the method 300) the delayed attenuated portion 404 to the input signal 108.

However, as also depicted in FIG. 4, the echo 121 of the output receive signal 120 is received at the send input 104 such that the input signal 108, to which the delayed attenuated portion 404 is added, includes the echo 121. As such, when the delayed attenuated portion 404 is added to the input signal 108 via the adder engine 128, the input signal 108 includes the echo 121 and the delayed attenuated portion 404 (e.g., as depicted after the adder engine 128 on the send path 102).

As depicted, it is understood that the echo 121 and the delayed attenuated portion 404 are aligned such that the echo 121 and the delayed attenuated portion 404 appear in FIG. 4, after the adder engine 128, as being summed together.

Furthermore, for simplicity, in FIG. 4, while the input signal 108, the echo 121, and the echo 121 summed with the delayed attenuated portion 404, are depicted as separate from each other, it understood that, prior to the adder engine 128, the input signal 108 and the echo 121 are added together, and after the adder engine 128, the input signal 108, and the echo 121 summed with the delayed attenuated portion 404, are added together.

As also depicted in FIG. 4, the echo estimator engine 122 samples the input receive signal 118 to generate a respective sampled portion 406 of the receive signal 118. The echo estimator engine 122 further samples the input signal 108 that includes the echo 121 and the delayed attenuated portion 404, to generate a respective sampled portion 408 of the input signal 108 (e.g., with the echo 121 summed with the delayed attenuated portion 404 added thereto).

The echo estimator engine 122 compares the portions 406, 408, to search for a section of the portion 408 that is similar to the portion 406, as well as a relative intensity and temporal location thereof, to generate an estimated echo 410. Indeed, as depicted, the estimated echo 410 is similar to the echo 121 summed with the delayed attenuated portion 404. The estimated echo 410 may comprise the portion 406 increased or decreased in intensity to about match the intensity of the echo 121 summed with the delayed attenuated portion 404.

The echo estimator engine 122 provides (e.g., at the block 306 of the method 300) the estimated echo 410 to the subtractor engine 124, for example according to an estimated temporal location of the echo 121 summed with the delayed attenuated portion 404 on the send path 102. The subtractor engine 124 subtracts (e.g., at the block 308 of the method 300) the estimated echo 410 from the input signal 108 to generate the output send signal 110. As depicted, the output send signal 110 has successfully had the echo 121 summed with the delayed attenuated portion 404 subtracted therefrom, and hence the echo 121 is cancelled. However, when the echo 121 summed with the delayed attenuated portion 404 is not successfully cancelled at the output send signal 110, the echo estimator engine 122 may increase or decrease the intensity of the estimated echo 410 and/or change the temporal location of the estimated echo 410 relative to the incoming send signal 108 such that the echo estimator engine 122 converges on an estimated echo 410 in a feedback loop that successfully cancels the echo 121 summed with the delayed attenuated portion 404 in the output send signal 110.

Figure 5:
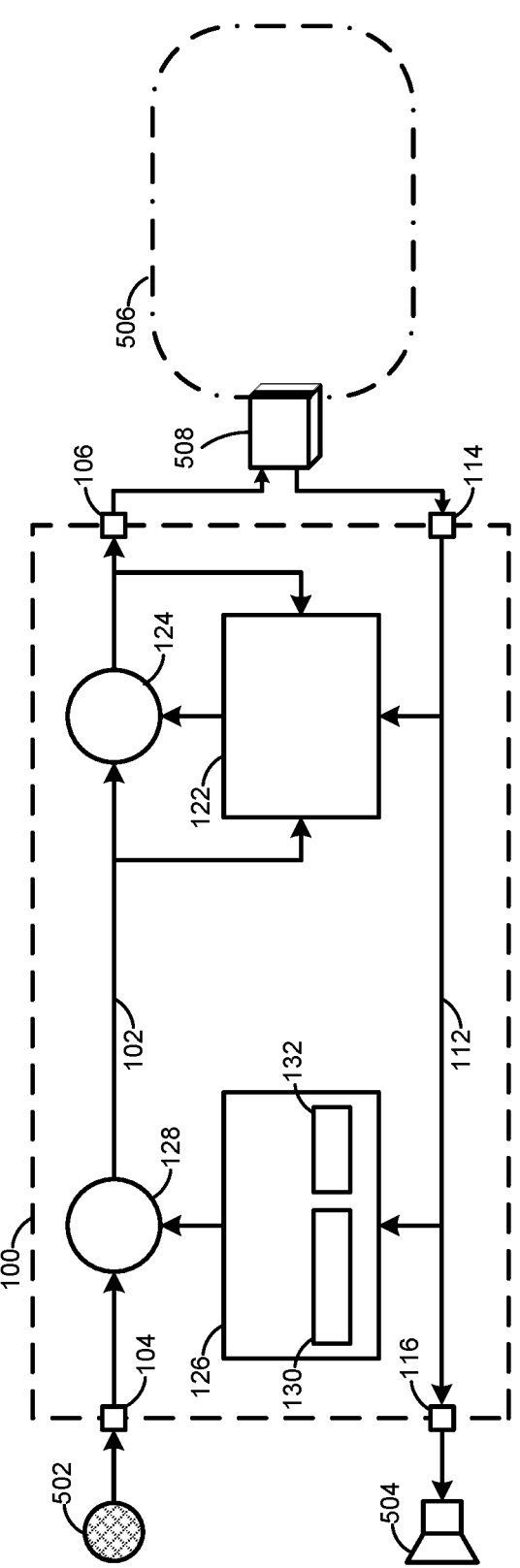
FIG. 5 depicts the device of FIG. 1 in a form to cancel echo between a speaker and a microphone, in accordance with exemplary embodiments of the specification.
Figure 6:
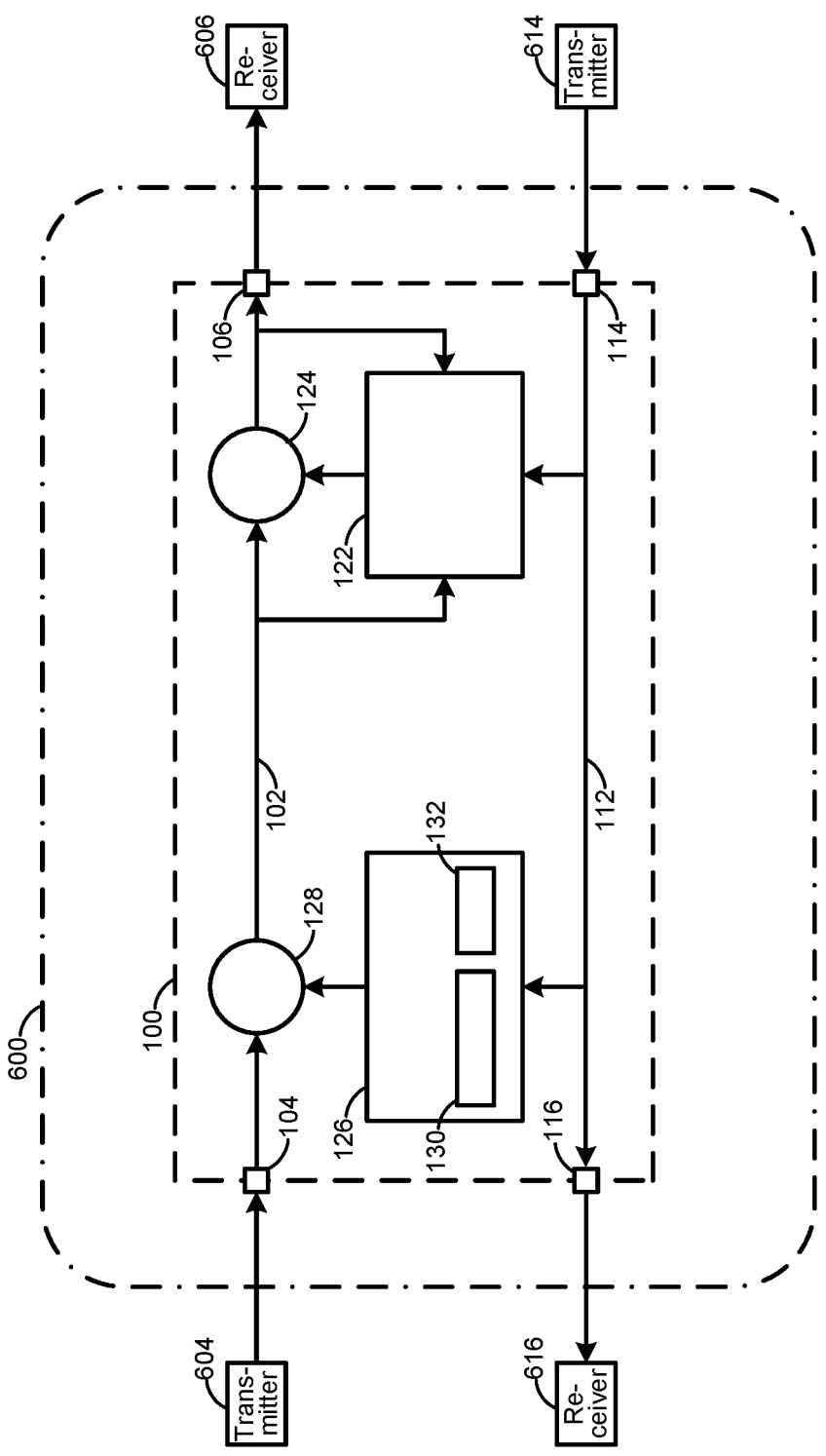
FIG. 6 depicts the device of FIG. 1 in a form of a line or network echo canceller, in accordance with exemplary embodiments of the specification.

Examples of the device 100 in various use cases are next described with respect to FIG. 5 and FIG. 6. While the signals 108, 110, 118, 120 and the echo 121 are not depicted in FIG. 5 and FIG. 6, they may nonetheless be present when the device 100 is in operation.

With attention first directed to FIG. 5, the send input 104 may be connected to a microphone 502 such that the input send signal 108 is received from the microphone 502.

Furthermore, the receive output 116 may be connected to a speaker 504 such that the receive signal 120 is output at the speaker 504 and the echo 121 may occur between the speaker 504 and the microphone 502.

As also depicted in FIG. 5, the send output 106 may be connectable to a network 506, for example via a connector 508 (e.g., such as a Universal Serial Bus (USB) connector, a network connector, and the like), such that the output send signal 110 is sent to the network 506. Similarly, the receive input 114 may also be connectable to the network 506, via the connector 508, such that the input receive signal 118 is received from the network 506.

In some examples, the device 100 may comprise a headset, and the microphone 502, speaker 504 and connector 508 may respectively comprise a microphone, speaker and connector of the headset. In particular, in these examples, the send input 104 may comprise a microphone 502 of the headset such that the input send signal 108 is received from the microphone 502; the send output 106 may be connectable to the network 506 (e.g., via the connector 508) such that the output send signal 110 is sent to the network 506; the receive input 114 may be connectable to the network 506 (e.g., via the connector 508) such that the input receive signal 118 is received from the network 506; and the receive output 116 may comprise the speaker 504 of the headset such that the output receive signal 120 is output at the speaker 504 and the echo 121 occurs between the speaker 504 and the microphone 502.

Attention is next directed to FIG. 6, in which the device 100 is depicted in the form of a line echo canceller or network echo canceller located within a network 600. In these examples, the send input 104 may be connectable to a first network component 604 (e.g., such as a first transmitter) on a first side of the network 600 such that the input send signal 108 is received from the first network component 604.

The send output 106 may be connectable to a second network component 606 (e.g., such as a first receiver) on a second side of the network 600, opposite the first side, such that the output send signal 110 is sent to the second network component 606.

The receive input 114 may be connectable to a third network component 614 (e.g., such as a second transmitter)

on the second side of the network 600 such that the receive signal 118 is received from the third network component 614.

The receive output 116 may be connectable to a fourth network component 616 (e.g., such as a second receiver) on the first side of the network 600 such that the output receive signal 120 is transmitted to the fourth network component 616. In these examples, the echo 121 may occur between the receive output 116 and the send input 104 via the network 600 and/or via the paths 102, 112, etc.

As should by now be apparent, the operations and functions of the devices described herein are sufficiently complex as to require their implementation on a computer system, and cannot be performed, as a practical matter, in the human mind. In particular, computing devices, and the like, such as set forth herein are understood as requiring and providing speed and accuracy and complexity management that are not obtainable by human mental steps, in addition to the inherently digital nature of such operations (e.g., a human mind cannot cancel echo, sample signals, among other features and functions set forth herein).

It is further understood that instance of the term "configured to", such as "a computing device configured to . . . ", "a processor configured to . . . ", "a controller configured to . . . ", as "an engine configured to . . . ", and the like, may be understood to include a feature of a computer-readable storage medium having stored thereon program instructions that, when executed by a computing device and/or a processor and/or a controller, and the like, may cause the computing device and/or the processor and/or the controller to perform a set of operations, which may comprise the features that the computing device and/or the processor and/or the controller, and the like, are configured to implement. Hence, the term "configured to" is understood not to be unduly limiting to means plus function interpretations, and the like.

Furthermore, descriptions of one processor and/or controller and/or device and/or engine, and the like, configured to perform certain functionality is understood to include, but is not limited to, more than one processor and/or controller and/or device and/or engine, and the like performing such functionality.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein may be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein may be achieved using a computing apparatus that has access to a code memory (not shown), which stores computer-readable program code for operation of the computing apparatus. The computer-readable program code could be stored on a computer readable storage medium, which is fixed, tangible and readable directly by these components, (e.g., removable diskette, CD-ROM, ROM, fixed disk, USB drive). Furthermore, it is appreciated that the computer-readable program may be stored as a computer program product comprising a computer usable medium. Further, a persistent storage device may comprise the computer readable program code. It is yet further appreciated that the computer-readable program code and/or computer usable medium may comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium may be either a non-mobile medium (e.g., optical and/or digital and/or analog communications lines) or a mobile medium (e.g., microwave, infrared, free-space optical or other transmission schemes) or a combination thereof.

The present specification has been described above with reference to a number of exemplary embodiments and examples. It should be appreciated that the particular embodiments shown and described herein are illustrative of the specification and its best mode and are not intended to limit in any way the scope of the specification as set forth in the claims. It will be recognized that changes and modifications may be made to the exemplary embodiments without departing from the scope of the present specification. These and other changes or modifications are intended to be included within the scope of the present specification, as expressed in the following claims.

What is claimed is:

1. A device comprising:
a send path comprising a send input and a send output;
a receive path comprising a receive input and a receive output;
an echo estimator engine configured to determine an estimated echo comprising an estimate of an echo, on the send path, between the receive path and the send input;
a subtractor engine, on the send path, configured to subtract the estimated echo from a send signal received at the send input;
a delay buffer engine between the send path and the receive path; and
an adder engine on the send path between the send input and the subtractor engine, the adder engine in communication with the delay buffer engine, the send input, and the subtractor engine, and the subtractor engine in communication with the adder engine and the send output,
the delay buffer engine configured to provide, from the receive path to the adder engine, a delayed attenuated portion of a receive signal, received at the receive input, the delayed attenuated portion delayed by a given delay period corresponding to at least a delay of the echo between the receive path and the send input,
the adder engine configured to add the delayed attenuated portion to the send signal at a same or similar temporal location as the echo in the send signal, due to buffering of the delayed attenuated portion of the receive signal by the delay buffer engine, and
the echo estimator engine further configured to determine the estimated echo using at least the delayed attenuated portion of the receive signal added to the send signal, wherein the echo estimator engine in communication with the send path between the subtraction engine and the adder engine, and the echo estimator engine in further communication with the send path between the subtraction engine and the send output, and the echo estimator engine is in further communication with the receive path, and
wherein the echo estimator engine provides a feedback loop comparing the receive signal, that represents the echo, with the send signal, prior to the subtractor engine, to locate the estimated echo added to the send signal by the adder engine.

2. The device of claim 1, wherein the echo estimator engine is further configured to determine the estimated echo by:
sampling the receive signal on the receive path;
sampling the send signal on the send path between the adder engine and the subtractor engine, which includes the echo and the delayed attenuated portion added thereto; and
sampling the send signal on the send path after the subtractor engine subtracts the estimated echo.

3. The device of claim 1, wherein the delay buffer engine comprises a sampler and a buffer,
wherein the sampler is configured to sample and attenuate the receive signal on the receive path to generate an attenuated portion of the receive signal, and
wherein the buffer is configured to buffer the attenuated portion of the receive signal by the given delay period to generate the delayed attenuated portion of the receive signal.

4. The device of claim 1, wherein the delay buffer engine is configured to sample and attenuate the receive signal by a given attenuation factor.

5. The device of claim 1, wherein the delay buffer engine is configured to sample and attenuate the receive signal by a given attenuation factor, and the given attenuation factor is based on a modelled echo path between the receive output and the send input.

6. The device of claim 1, wherein a cancellation window of the echo estimator engine is selected such that the echo in the send signal, and the delayed attenuated portion added to the send signal occur within the cancellation window.

7. The device of claim 1, further comprising a headset, wherein:
the send input comprises a microphone of the headset such that the send signal is received from the microphone;
the send output is connectable to a network such that the send signal is sent to the network;
the receive input is connectable to the network such that the receive signal is received from the network; and
the receive output comprises a speaker of the headset such that the receive signal is output at the speaker and the echo occurs between the speaker and the microphone.

8. The device of claim 1, wherein:
the send input is connected to a microphone such that the send signal is received from the microphone;
the send output is connectable to a network such that the send signal is sent to the network;
the receive input is connectable to the network such that the receive signal is received from the network; and
the receive output is connected to a speaker such that the receive signal is output at the speaker and the echo occurs between the speaker and the microphone.

9. The device of claim 1, further comprising a line echo canceller or network echo canceller located within a network, wherein:

the send input is connectable to a first network component on a first side of the network such that the send signal is received from the first network component;

the send output is connectable to a second network component on a second side of the network, opposite the first side, such that the send signal is sent to the second network component;

the receive input is connectable to a third network component on the second side of the network such that the receive signal is received from the third network component; and the receive output is connectable to a fourth network component on the first side of the network such that the receive signal is transmitted to the fourth network component, and the echo occurs between the receive output and the send input via the network.

10. A method for implementation at a device comprising a send path and a receive path, the send path comprising a send input and a send output, and the receive path comprising a receive input and a receive output, the method comprising:

providing, via a delay buffer engine, from the receive path to an adder engine on the send path, a delayed attenuated portion of a receive signal received at the receive input, the delayed attenuated portion delayed by a given delay period corresponding to at least a delay of an echo on the send path, between the receive path and the send input; the adder engine on the send path between the send input and a subtractor engine; the subtractor engine, on the send path, between the adder engine and the send output, wherein the adder engine is in communication with the delay buffer engine, the send input, and the subtractor engine, and the subtractor engine in communication with the adder engine and the send output;

adding, via the adder engine, the delayed attenuated portion to a send signal received at the send input at a same or similar temporal location as the echo in the send signal, due to buffering of the delayed attenuated portion of the receive signal by the delay buffer engine;

providing, via an echo estimator engine, to the subtractor engine, an estimated echo comprising an estimate of the echo, on the send path, between the receive path and the send input, the estimated echo including the delayed attenuated portion; and, subtracting, via the subtractor engine, the estimated echo from the send signal received at the send input, wherein the echo estimator engine in communication with the send path between the subtraction engine and the adder engine, and the echo estimator engine in further communication with the send path between the subtraction engine and the send output, and the echo estimator engine is in further communication with the receive path, and wherein the echo estimator engine provides a feedback loop comparing the receive signal, that represents the echo, with the send signal, prior to the subtractor engine, to locate the estimated echo added to the send signal by the adder engine.

11. The method of claim 10, further comprising determining the estimated echo by:

sampling, via the echo estimator engine, the receive signal on the receive path;

sampling, via the echo estimator engine, the send signal on the send path between the adder engine and the subtractor engine, which includes the echo and the delayed attenuated portion added thereto; and sampling, via the echo estimator engine, the send signal on the send path after the subtractor engine subtracts the estimated echo.

12. The method of claim 10, wherein the delay buffer engine comprises a sampler and a buffer, wherein method further comprises:

sampling and attenuating, via the sampler, the receive signal on the receive path to generate an attenuated portion of the receive signal, and buffering, via the buffer, the attenuated portion of the receive signal by the given delay period to generate the delayed attenuated portion of the receive signal.

13. The method of claim 10, further comprising:

sampling and attenuating, via the delay buffer engine, the receive signal by a given attenuation factor.

14. The method of claim 10, further comprising:

sampling and attenuating, via the delay buffer engine, the receive signal by a given attenuation factor, and the given attenuation factor is based on a modelled echo path between the receive output and the send input.

15. The method of claim 10, wherein a cancellation window of the echo estimator engine is selected such that the echo in the send signal, and the delayed attenuated portion added to the send signal occur within the cancellation window.

16. The method of claim 10, wherein the device further comprises a headset, and wherein:

the send input comprises a microphone of the headset such that the send signal is received from the microphone;

the send output is connectable to a network such that the send signal is sent to the network;

the receive input is connectable to the network such that the receive signal is received from the network; and the receive output comprises a speaker of the headset such that the receive signal is output at the speaker and the echo occurs between the speaker and the microphone.

17. The method of claim 10, wherein:

the send input is connected to a microphone such that the send signal is received from the microphone;

the send output is connectable to a network such that the send signal is sent to the network;

the receive input is connectable to the network such that the receive signal is received from the network; and the receive output is connected to a speaker such that the receive signal is output at the speaker and the echo occurs between the speaker and the microphone.

18. The method of claim 10, wherein the device further comprises a line echo canceller or network echo canceller located within a network, wherein:

the send input is connectable to a first network component on a first side of the network such that the send signal is received from the first network component;

the send output is connectable to a second network component on a second side of the network, opposite the first side, such that the send signal is sent to the second network component;

the receive input is connectable to a third network component on the second side of the network such that the receive signal is received from the third network component; and the receive output is connectable to a fourth network component on the first side of the network such that the receive signal is transmitted to the fourth network component, and the echo occurs between the receive output and the send input via the network.

19. A non-transitory computer-readable medium storing a computer program, wherein execution of the computer program is for implementation at a device comprising a send path and a receive path, the send path comprising a send input and a send output, and the receive path comprising a receive input and a receive output, the computer program for:

provides, via a delay buffer engine, from the receive path to an adder engine on the send path, a delayed attenuated portion of a receive signal received at the receive input, the delayed attenuated portion delayed by a given delay period corresponding to at least a delay of an echo on the send path, between the receive path and the send input; the adder engine on the send path between the send input and a subtractor engine; the subtractor engine, on the send path, between the adder engine and the send output, wherein the adder engine is in communication with the delay buffer engine, the send input, and the subtractor engine, and the subtractor engine in communication with the adder engine and the send output;

adding, via the adder engine, the delayed attenuated portion to a send signal received at the send input at a same or similar temporal location as the echo in the send signal, due to buffering of the delayed attenuated portion of the receive signal by the delay buffer engine;

providing, via an echo estimator engine, to the subtractor engine, an estimated echo comprising an estimate of the echo, on the send path, between the receive path and the send input, the estimated echo including the delayed attenuated portion; and, subtracting, via the subtractor engine, the estimated echo from the send signal received at the send input, wherein the echo estimator engine in communication with the send path between the subtraction engine and the adder engine, and the echo estimator engine in further communication with the send path between the subtraction engine and the send output, and the echo estimator engine is in further communication with the receive path, and wherein the echo estimator engine provides a feedback loop comparing the receive signal, that represents the echo, with the send signal, prior to the subtractor engine, to locate the estimated echo added to the send signal by the adder engine.

20. The non-transitory computer-readable medium of claim 19, wherein the computer program is further for determining the estimated echo by:

sampling, via the echo estimator engine, the receive signal on the receive path;

sampling, via the echo estimator engine, the send signal on the send path between the adder engine and the subtractor engine, which includes the echo and the delayed attenuated portion added thereto; and sampling, via the echo estimator engine, the send signal on the send path after the subtractor engine subtracts the estimated echo.

* * * * *